(12) United States Patent
Vogt-Birnbrich et al.

(10) Patent No.: US 6,258,875 B1
(45) Date of Patent: Jul. 10, 2001

(54) AQUEOUS DISPERSIONS OF EPOXY RESINS

(75) Inventors: Bettina Vogt-Birnbrich, Solingen; Morenike Gisela Awokola, Cologne; Heike Beyers, Wuppertal, all of (DE)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/527,648

(22) Filed: Mar. 17, 2000

(51) Int. Cl.⁷ .............................. C08K 3/20; C08L 63/02
(52) U.S. Cl. .................. 523/417; 523/415; 525/528; 528/65; 528/68; 528/73
(58) Field of Search ........................... 523/415, 417; 525/528; 528/65, 68, 73; 549/553, 555, 562

(56) References Cited

U.S. PATENT DOCUMENTS

| | | | |
|---|---|---|---|
| 4,399,242 | 8/1983 | Fowler et al. | 523/404 |
| 4,886,845 | 12/1989 | Becker et al. | 523/403 |
| 4,987,163 * | 1/1991 | Becker et al. | 523/414 |
| 5,935,710 | 8/1999 | Hoenel et al. | 428/413 |
| 6,008,314 | 12/1999 | Collong et al. | 528/123 |

FOREIGN PATENT DOCUMENTS

| | | |
|---|---|---|
| 0 346 742 B1 | 9/1995 | (EP) . |
| 0 610 068 B1 | 10/1999 | (EP) . |

* cited by examiner

*Primary Examiner*—Robert Dawson
*Assistant Examiner*—D. Aylward
(74) *Attorney, Agent, or Firm*—Joseph A. Tessari

(57) ABSTRACT

Aqueous dispersions of modified epoxy resins with a urethane and a urea group content of 5–250 mmol, based on 100 g solid content of the dispersion, containing one or more modified epoxy resins A) having an epoxy equivalent weight of 250–10,000, whereby the modified epoxy resins A) are the reaction product of A1) 43,0–86,0 wt-% of one or more epoxy compounds having at least 2 epoxy groups per molecule and an epoxy equivalent weight of 100 to 2000, A2) 10,0–25,0 wt-% of one or more aromatic polyols, A3) 2,0–12,0 wt-% of one or more aliphatic polyols and A4) 2,0–20,0 wt-% of one or more polyisocyanates.

10 Claims, No Drawings

AQUEOUS DISPERSIONS OF EPOXY RESINS

BACKGROUND OF THE INVENTION

The invention relates to aqueous dispersions of modified epoxy resins, which are suitable as binders for aqueous coating Compositions. They are particularly used in the preparation of primer and/or primer surfacer layers in vehicle and in industrial coating.

Aqueous dispersions of epoxy resins are known in the prior art.

DE-A-3643751 for example describes aqueous dispersions of epoxy resins, which are obtained by reaction of epoxy compounds having at least two epoxy groups per molecule with an aromatic polyol and a condensation product of an aliphatic polyol and of an epoxy compound.

In EP-A-610068 epoxy resins for aqueous epoxide/amine-systems are described, which contain 20–70 wt-% of an epoxy resin and 5–40 wt-% of a self-emulsive epoxy resin, whereby the latter is obtained by reaction of a urethane compound, prepared from a polyalkylene polyether polyol and a polyisocyanate in excess, with an epoxy compound having hydroxyl groups and an alkylphenol ethoxylate.

EP-A-346 742 describes water-dilutable epoxy resins, obtained by reaction of epoxy compounds having at least two epoxy groups per molecule with an aromatic polyol and a condensation product of an aliphatic polyol, an epoxy compound and a mono- or diisocyanate, whereby the condensation product is present in the epoxy resin at 3–15 wt-%.

Further, water-dilutable epoxy resins, which are reaction products of a diglycidyl ether of a dihydric phenol, a dihydric phenol, a diglycidyl ether of a polyoxyalkylene glycol and a diisocyanate, are disclosed in U.S. Pat. No. 4,399,242. Additionally the water-dilutable epoxy resin contains an aliphatic monoepoxide as a reaction diluent.

The mentioned aqueous dispersions of epoxy resins of the prior art can be used in coating compositions, for example in combination with polyamine curing agents in aqueous two-component coating compositions. It is, however, a disadvantage of the aforementioned dispersions of epoxy resins that as binder components in aqueous two-component coating compositions lead to coating formulations which do not have the same high level of quality as the corresponding solvent-based coating formulations. In particular the poor sandability of the obtained coatings has shown to be of considerable disadvantage in the wet as well as in the dry state. The over long drying times, in particular the insufficient through-drying and the unsatisfactory final hardness of the obtained coatings are likewise unfavourable. The adhesion to the substrate is also often unsatisfactory.

The object of the invention was therefore to provide aqueous dispersions of epoxy resins, which, in combination with cross-linking agents, in particular with amino-functional cross-linking agents, can be processed into coating compositions which give the coatings an excellent sandability in the wet as well as in particular in the dry state. The coating compositions should likewise be applicable without difficulty as thick layers and should result in coatings with a rapid through-drying and a good final hardness. A good adhesion to most varied substrates should be assured.

SUMMARY OF THE INVENTION

The invention provides an aqueous dispersion of modified epoxy resins with an epoxy equivalent weight of 250–10,000 and with a urethane and urea group content of 5–250 mmol based on 100 g solid content of the dispersion.

In another aspect, the invention provides an aqueous dispersion of modified epoxy resins with a urethane and urea group content of 5–250 mmol, based on 100 g solid content of the dispersion, containing at least one modified epoxy resin A) with an epoxy equivalent weight of 250–10,000, which epoxy resin is the reaction product of:

A1) 43.0–86.0 wt-% of at least one epoxy compound having at least 2 epoxy groups per molecule and an epoxy equivalent weight of 100 to 2000, A2) 10.0–25.0 wt-% of at least one aromatic polyol, A3) 2.0–12.0 wt-% of at least one aliphatic polyol and A4) 2.0–20.0 wt-% of at least one polyisocyanate, wherein the percentages are relative to solid content and wherein the sum of the components A1), A2), A3) and A4) adds up to 100 wt-%.

The modified epoxy resins A) comprise an epoxy equivalent weight of 250–10,000, preferably of 450–2500, in particular preferably of 350–1500. The modified epoxy resins A) preferably comprise cross-linked parts, preferably in amounts of 0.5–50 wt-% (based on the solid content; determined as the insoluble part in tetrahydrofurane).

The aqueous dispersions of the modified epoxy resins have a urethane and urea group content of 5–250 mmol, preferably of 10–150 mmol, based on 100 g solid content of the dispersion. The solid content of the dispersion is thereby composed of the solid resin content of the epoxy resin prepared from the components A1), A2), A3) and A4) and of the solid content of the by-products formed in the reaction of the components A1), A2), A3) and A4).

The epoxy compounds A1) are polyepoxides with an average of at least 2 epoxy groups per molecule. These epoxy compounds can be saturated, unsaturated, aliphatic, cycloaliphatic, aromatic or heterocyclic and, optionally can also comprise hydroxyl groups. They can also comprise substituents, such as, for example, alkyl or aryl substituents or ether groups.

The epoxy compounds A1) preferably comprise polyglycidyl ethers based on polyhydric, preferably dihydric alcohols, phenols, hydrogenation products of these phenols and/or of novolaks (reaction products of mono- or polyhydric phenols with aldehydes, in particular with formaldehyde in the presence of acid catalysts). The preferred epoxy equivalent weights of these epoxy compounds are between 160–500. Examples of polyhydric phenols are resorcin, hydroquinone, 2,2-bis-(4-hydroxyphenyl)propane (bisphenol A), dihydroxydiphenylmethane (bisphenol F, optionally mixtures of isomers), 4,4'-dihydroxy-3,3'-dimethyldiphenylpropane, 4,4'-dihydroxydiphenyl, 4,4'-dihydroxydiphenylcyclohexane, 4,4'-dihydroxybenzophenol, bis-(4-hydroxyphenyl)-1,1-ethane, 1,5-dihydroxynaphthalene.

Polyglycidyl ethers of polyhydric alcohols are likewise suitable. Examples of polyhydric alcohols are ethylene glycol, diethylene glycol, triethylene glycol, 1,2- and 1,3-propylene glycol, polyoxypropylene glycols, 1,4-butylene glycol, 1,5-pentane diol, 1,6-hexane diol, glycerin, bis-(4-hydroxycyclohexyl)-2,2-propane. Polyglycidyl esters of polycarboxylic acids, which are obtained by reaction of for example epichlorhydrine with an aliphatic, aromatic or cycloaliphatic polycarboxylic acid, can also be used. Examples of polyglycidyl esters of polycarboxylic acids are diglycidyl esters of adipic acid, diglycidyl esters of phthalic acid and diglycidyl esters of hexahydrophthalic acid.

Mixtures of several epoxy compounds A1) can be used. Polyglycidyl ethers of bisphenol A are preferably used.

The aromatic polyols A2) are preferably the aromatic hydroxyl group-containing compounds mentioned already above in the description of the components A1). These are for example polyhydric, preferably dihydric phenols, halogenation products thereof and/or novolaks. Preferably the OH-groups are bonded directly to the aromatic ring. It is particularly preferred to use bisphenol A.

The aliphatic polyols A3) comprise polyols selected from the group of polyacrylates, polyesters, polyethers, polycarbonates and polyurethane polyols. The aliphatic polyols are provided, in a manner known to the person skilled in the art, with a hydrophilic group assuring sufficient water-dilutability. Preferably polyether polyols are used as the aliphatic polyols A3). They can comprise for example polyether polyols with average weight molecular weights Mw of 600–12,000 g/mol, preferably of 2000–8000 g/mol and OH-numbers of for example 10–200 mg KOH/g, preferably of 15–100 mg KOH/g. The aliphatic polyols have preferably only terminal primary OH-groups. Examples of the preferred polyether polyols are polyethylene, polypropylene, polybutylene glycols and block copolymers of ethylene oxide and propylene oxide. Mixtures of the polyalkylene glycols can be used. Polyethylene glycols are preferably used.

The polyisocyanates A4) are for example conventional aliphatic, cycloaliphatic or aromatic polyisocyanates, known in the field of polyurethane and coatings, which may be used individually or in combination. They can also comprise polyisocyanates containing ether or ester groups. Aliphatic and cycloaliphatic polyisocyanates are preferably used.

The polyisocyanates may show a functionality of 1.5–5, preferably higher than 2.

Examples of suitable polyisocyanates are diisocyanates such as trimethylene diisocyanate, tetramethylene diisocyanate, pentamethylene diisocyanate, hexamethylene diisocyanate, propylene diisocyanate, ethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 1-isocyanatomethyl-5-isocyanato-1,3,3-trimethylcyclohexane, bis-(4-isocyanato-phenyl)-methane, norbornenediisocyanate, 4,4-diisocyanato-diphenylether, 1,5-dibutylpentamethylene diisocyanate, 2,3-bis-(8-isocyanatooctyl)-4-octyl-5-hexylcyclohexane, 3-isocyanatomethyl-1-methylcyclohexyl-isocyanate, and 2,6-diisocyanatomethyl capronate.

Diisocyanates with 4 to 25, preferably 6 to 16 C-atoms, may be used, which contain one or two linear, branched or cyclic alkyl groups with 1 to 12, preferably 1 to 4 C-atoms, in alpha-position with respect to the NCO-group, as substituents on the skeletal structure. The skeletal structure can consist of an aromatic or alicyclic ring or of an aliphatic linear or branched C-chain with 1 to 12 C-atoms. Examples of the latter are 1-isocyanato-3,3,5-trimethyl-5-isocyanatomethyl cyclohexane (IPDI), bis-(4-isocyanatocyclohexyl)methane, 1,1,6,6-tetramethyl-hexamethylene diisocyanate, 1,5-dibutyl-pentamethylene diisocyanate, 3-isocyanatomethyl-1-methyl-cyclohexyl-isocyanate, p- and m-tetramethylxylylene diisocyanate and the corresponding hydrated homologues.

Examples of preferred polyisocyanates with a functionality higher than 2 can be obtained by suited reaction of diisocyanates, of the aforementioned type for example, to compounds of a higher functionality, for example by trimerisation or by reaction with water or polyols, such as, for example, trimethylolpropane, glycerin or pentaerythrite. Likewise triisocyanates, such as, for example, nonanetriisocyanate, can be used.

The known derivatives of the aforementioned diisocyanates having biuret, allophanate, urethane and/or isocyanurate groups are generally well suited.

Particularly suitable are for example "lacquer-polyisocyanates" based on hexamethylene diisocyanate (HDI), 1-isocyanato-3,3,5-trimethyl-5-isocyanatomethyl-cyclohexane (IPDI) and/or bis(isocyanatocyclohexyl)-methane as well as preferably derivatives of these diisocyanates having biuret, allophanate, urethane and/or isocyanurate groups.

Likewise it is possible to use partially blocked polyisocyanates with at least two free isocyanate groups.

The polyisocyanates can be used individually or as a mixture.

The epoxy resins A) are prepared by reaction of the components A1), A2), A3) and A4). Thereby one can first prepare an epoxy-functional condensation product with an epoxy equivalent weight of 250–8,000 from the components A1, A2 and A3. Subsequently reaction with the polyisocyanates A4) can take place.

The reaction of the components A1), A2) and A3) can be carried out in various ways. It can be carried out in one or more steps. The reaction can for example be carried out such that the total amount of components A1) and of components A2) are first reacted together at increased temperatures of for example 50–200° C., preferably 90–150° C. The reaction can be carried out in the presence of catalysts, for example acid catalysts, such as, for example, $BF_3$-diethylether, $BF_3$-acetic acid and tetrafluorboric acid or alkaline catalysts, such as, for example, amines, such as monoethylamine and benzylamine. The reaction is expediently traced by the increase of the epoxy equivalent weight, which shows a reduction of the epoxy groups.

Subsequently the reaction of the condensation product obtained from A1) and A2) with the aliphatic polyols A3) can take place.

Alternatively it is also possible to first react together a part of the components A1) and A2) and then to further react the condensation product obtained in this way with the aliphatic polyols A3). Subsequently, the further reaction with the remaining parts of the components A1) and components A2) can take place. It is thereby possible to first prepare a pre-product with the components A1) and A2) and then to further react this pre-product or to further react the components A1) and A2) as separate components.

Likewise, for the preparation of modified epoxy resins it is possible to first react a part of the epoxy components A1) with the polyol component A3) to a condensation product. This hydroxy-functional or preferably however epoxy-functional condensation product is then reacted with further parts of the epoxy-component A1) and the aromatic polyol A2). It is thereby possible to react the condensation product of the components A1) and A3) with the components A1) and A2) in one step, or to first prepare a pre-product with the components A1) and A2) and then to further react the latter with the condensation product of A1) and A3).

An additional possibility for the preparation of a condensation product of A1), A2) and A3) is the simultaneous reaction of the components A1), A2) and A3) in a one-step process.

The stoichiometric amounts of the components A1), A2) and A3) in the individual process variants thereby have to be chosen such that an epoxy-functional reaction product with the desired epoxy equivalent weight of 250–8,000 is obtained.

The epoxy-functional reaction product of the components A1), A2) and A3) is subsequently reacted with the polyisocyanates A4).

The reaction of the condensation product obtained from A1), A2) and A3) with the polyisocyanates A4) can take place in the resin phase or in the aqueous phase.

In the resin phase the reaction can take place for example at temperatures of 50–140° C., preferably of 70–135° C., optionally in the presence of organic solvents which are inert to isocyanate groups. Organic solvents which are inert to isocyanate groups are for example esters such as ethyl acetate, methylglycol acetate, ethylglycol acetate and ketones such as methylethylketone, methylisobutylketone. For this reaction, catalysts conventionally employed in isocyanate chemistry can be used, such as, for example, tertiary amines, for example diazobicyclooctane, or tin compounds, for example tin(II) octoate, dibutyl tin oxide, dibutyl tin dilaurate.

Subsequently the conversion of the reaction product thus obtained into the aqueous phase can take place. External anionic, cationic and/or non-ionic emulgators can optionally be further used during the conversion into the aqueous phase. In particular non-ionic emulgators can be preferably used. Examples of non-ionic emulgators are ethoxylated and/or propoxylated alcohols, alkylphenols, fatty acids, fatty amines, fatty alcohols, ethylene oxide-propylene oxide block copolymers and optionally modified esters of fatty acids of polyalkoxylated polyhydric alcohols.

Organic solvents which are occasionally present can be distilled off.

The reaction of the condensation product obtained from A1), A2) and A3) with the polyisocyanates A4) can however also take place in the aqueous phase. The condensation product of A1), A2) and A3) is thereby first converted into the aqueous phase, optionally with the use of external emulgators of the aforementioned type. Next follows the reaction with the polyisocyanates A4). This can for example take place at temperatures of 20–95° C. and optionally in the presence of the aforementioned catalysts.

The reaction of the condensation product obtained from A1), A2) and A3) with the polyisocyanates A4) can also however take place in a combined way, partially in the resin phase and partially in the aqueous phase. Thereby a part of the polyisocyanates A4) is first reacted with the condensation product obtained from A1), A2) and A3) in the resin phase and the remaining part of polyisocyanates A4) is brought to the reaction after the transition into the aqueous phase. In the resin phase 10–70 wt-% and in the aqueous phase 30–90 wt-% of the polyisocyanates A4), based on the total amount of polyisocyanates A4), can for example be reacted.

The polyisocyanates can be used in amounts of 2–20 wt-%, based on the total amount of A1), A2), A3) and A4).

In each case it must however be assured that the required urethane and urea group content is obtained in the modified dispersion of epoxy resins, by reaction of the condensation products obtained from the components A1), A2) and A3) with the polyisocyanates A4).

An additional embodiment of the invention consists of mixing the condensation products obtained by reacting the components A1), A2) and A3) with further epoxy compounds, which are not modified by the component A3). The further epoxy compounds which are not modified by component A3) are for example those which have been described above as component A1) and/or as condensation product from A1) and A2). The further epoxy compounds, which are not modified by component A3) can be used in preferred amounts of 0–50 wt-%, based on the condensation products obtained by the reaction of the components A1), A2) and A3), and based respectively on the solid content. The mixing of the condensation products obtained by the reaction of the components A1), A2) and A3) with the further epoxy compounds is preferably carried out in the resin phase. Subsequently, the reaction with the polyisocyanates in the resin phase can take place, as decribed above, or the conversion of the mixture into the aqueous phase is first carried out and then the reaction with the polyisocyanates. Likewise, it is here possible to carry out the reaction with the polyisocyanates as a combined reaction, such as described above, in the resin as well as in the aqueous phase.

Likewise it must be assured here that the required urethane and urea group content is obtained in the aqueous, modified dispersion of the epoxy resins, through reaction of the condensation products obtained by the reaction of the components A1), A2) and A3) and the further epoxy compounds with the polyisocyanates A4).

It was surprisingly found that in particular products, which were prepared at least partially by reaction with the polyisocyanates A4) in the aqueous phase, show particularly advantageous properties of the coating compositions produced from epoxy dispersions and the coats resulting therefrom.

The aqueous dispersions of the modified epoxy resins A) contain 30–80 wt-%, preferably 35–65 wt-% water.

In the aqueous dispersions of the modified epoxy resins, the modified epoxy resins A) can be present in combination with further epoxy resins B), which are different from components A). For example the epoxy resins A) can be present at 50–100 wt-% and the further epoxy resins B) at 0–50 wt-%, based on the total amount of epoxy resin A) and epoxy resin B). Preferably, the epoxy resins A) are present at 70–100 wt-%, in particular preferably however at 100 wt-%.

The epoxy resins B), which are different from epoxy resins A), are for example those having at least 2 epoxy groups per molecule and an epoxy equivalent weight of 180–10,000, preferably of 250–5,000. They can be for example the previously described epoxy compounds A1) or the epoxy-functional reaction products of the components A1) with the components A2) and/or A3).

Certain quantities of additives conventionally used in coating compositions and organic solvents can optionally be contained in the aqueous dispersions of the modified epoxy resins.

As organic solvents glycols, monoether and diether esters of glycols with alcohols and acids, aliphatic alcohols optionally having branched C1–C12-alkyl radicals, cycloaliphatic and araliphatic alcohols as well as esters and ketones can for example be used. Examples of the mentioned organic solvents are ethylene glycol, ethylene glycol monomethylether, ethylene glycol dimethylether, dipropylene glycol dimethylether, butyl glycol, methoxypropanol, ethoxypropanol, ethanol, propanol, butanol, cyclohexanol, benzyl alcohol, acetone, methylisobutylketone. Preferably 2–15 wt-% of these solvents are contained in the aqueous self-emulsive dispersions of epoxy resins. They are preferably water-miscible organic solvents.

The additives conventionally used in coating compositions can comprise for example leveling agents, thickening agents, defoamers, surface-active agents, catalysts, emulgators and similar auxiliary products.

The additives and organic solvents can thereby be added before or after the reaction with the polyisocyanates A4). If organic solvents are added before the reaction with the polyisocyanates A4), then, in particular, organic solvents are used which are not reactive with isocyanates.

The aqueous dispersions of modified epoxy resins according to the invention can be used as binder components in aqueous coating compositions. The invention therefore also relates to aqueous coating compositions, containing aqueous dispersions of modified epoxy resins of the aforementioned type, one or more cross-linking agents, water and optionally organic solvents, pigments, fillers and/or additives conventionally used in coating compositions.

The cross-linking agents contain functional groups which are capable of reacting with the epoxy groups of the epoxy resins. The cross-linking agents may be for example cross-linking agents containing carboxyl groups or amino groups. The cross-linking agents containing carboxyl groups may be for example water-dilutable carboxy-functional (meth)acryl copolymers and/or water-dilutable carboxy-functional polyesters with acid numbers of for example 40–350 mg KOH/g. The carboxy-functional (meth)acryl copolymers and/or carboxy-functional polyesters may be urethanised and/or modified by reaction with lactones. The carboxy-functional (meth)acryl copolymers optionally containing urethane groups have for example an average molecular weight (Mn) of 1000–30,000 g/mol. The carboxy-functional polyesters optionally containing urethane groups can have for example a calculated molecular weight of 500–4000 g/mol. In order to obtain a sufficient water-dilutability, the cross-linking agents containing carboxyl groups are modified in a manner known to the person skilled in the art.

Furthermore, water-soluble or water-miscible polycarboxylic acids, their anhydrides or the acid esters of these acids with polyhydric alcohols can be used as cross-linking agents containing carboxyl groups.

The aqueous dispersions of epoxy resins according to the invention and the cross-linking agents containing carboxyl groups are preferably used in such weight proportions that there is an equivalent proportion of epoxy groups with respect to carboxyl groups of 1:3 to 3:1.

Preferably the aqueous dispersions of epoxy resins according to the invention are used in the coating compositions with cross-linking agents containing amino groups. The cross-linking agents containing amino groups may comprise for example polyamines, polyamidoamines, Mannich-bases, amine-epoxide-adducts and/or modified derivatives thereof.

Examples of polyamines are aliphatic polyalkylene amines, such as diethylene triamine, triethylene tetramine, tetraethylene pentamine, pentaethylene hexamine, propylene diamine, dipropylene triamine, further 2,2,4- and/or 2,4,4-trimethylhexamethylene diamine, bis-(3-aminopropyl)-amine, 1,4-bis-(3'-aminopropyl)-piperazine, N,N-bis(3-aminopropyl)ethylene diamine, neopentane diamine, 2-methyl-1,5-pentane diamine, 1,3-diaminopentane, hexamethylene diamine, as well as cycloaliphatic amines such as 1,2- or 1,3-diaminocyclohexane, 1,4-diamino-3,6-diethylcyclohexane, 1,2-diamino-4-ethylcyclohexane, 1,4-diamino-3,6-diethylcyclohexane, 1-cyclohexyl-3,4-diaminocyclohexane, isophorone diamine and reaction products thereof, 4,4'-diaminodicyclohexylmethane and -propane, 2,2-bis-(4-aminocyclohexyl)-methane and -propane, 3,3'-dimethyl-4,4'-diaminodicyclohexylmethane, 3-amino-1-cyclohexylaminopropane, 1,3- and 1,4-bis-(aminomethyl)-cyclohexane.

Araliphatic amines which are also suitable are in particular those, in which aliphatically bonded amino groups are present, for example meta and para xylylene diamine, or the hydrogenation products thereof.

Apart from the above mentioned polyamines, water-dilutable polyoxyalkylene polyamines with molecular weights of for example 100–2000 g/mol can be used, for example those which are commercially available under the name of Jeffamine®.

Useful polyamidoamines are for example those which are obtained by reaction of polyamines with mono- or polycarboxylic acids, for example dimerised fatty acids.

Useful and suitable Mannich-bases are those which are prepared through condensation of polyamines, such as, for example, diethylene triamine, triethylene tetramine, isophorone diamine, 2,2,4- and 2,4,4-trimethylhexamethylene diamine, 1.3- and 1.4-bis(aminomethyl)cyclohexane and meta and para xylylene diamine with aldehydes, preferably formaldehyde, and mono or polyhydric phenols having at least one core position able to react with aldehydes, for example the different cresols and xylenols, para-tert-butylphenol, 4,4'-dihydroxydiphenylmethane, preferably however phenol.

Representative examples of the amine-epoxide adducts are for example reaction products of polyamines, such as, for example, ethylene diamine, propylene diamine, hexamethylene diamine, 2,2,4-and 2,4,4-trimethylhexamethylene diamine, meta-xylylene diamine and/or bis-(aminomethyl)-cyclohexane with terminal mono- or polyepoxides, such as, for example, propylene oxide, hexene oxide, cyclohexene oxide, or with glycidyl ethers such as phenylglycidyl ether, tert-butylglycidyl ether, ethylhexylglycidyl ether, butylglycidyl ether or with glycidyl esters, such as for example the glycidyl ester of versatic acid or with polyglycidyl ethers and esters.

Likewise, very suitable as cross-linking agents containing amino groups are amino urethanes, which are obtained by reaction of (a) compounds with at least one 2-oxo-1,3-dioxolane group and/or 2-oxo-1,3-dioxane-group (cyclic carbonate group) with (b) one or more amines with at least one primary and/or secondary amino group, whereby the proportion of the amount of the cyclic carbonate groups to the amount of primary and/or secondary amino groups is 1:10 to 1:1.1, and which can preferably still be reacted with one or more hydrophilic water-dilutable epoxy compounds, such as to assure sufficient water-dilutability and a stable dispersion of the the amino urethanes. The hydrophilic water-dilutable epoxy compounds are reaction products of epoxy compounds having at least 2 epoxy groups per molecule with polyalkylene polyether polyols and/or with polyalkylene polyethers having primary and/or secondary terminal amino groups. Such amino urethanes are described for example in DE-A-43 44 510 and WO-A-97/49749, incorporated herein by reference.

The cross-linking agents containing amino groups can each be used individually or in combination.

The aqueous dispersions of epoxy resins according to the invention and the cross-linking agents containing amino groups are preferably used in weight proportions such that an equivalent proportion of the epoxy groups to the amino groups of 1:5 to 5:1, preferably of 1:2 to 2:1, is present.

The coating compositions containing the aqueous dispersions of epoxy resins according to the invention may contain pigments and/or fillers. These pigments may comprise colouring and/or effect pigments. Likewise, corrosion-protection pigments, such as, for example, zinc phosphate, may be included.

All organic or inorganic pigments conventionally used in coating compositions are suitable as colouring pigments. Examples of inorganic or organic colour-giving pigments are titanium dioxide, micronized titanium dioxide, iron oxide pigments, carbon black, azo-pigments, phthalocyanine pigments, chinacridon or pyrrolopyrrol pigments. Examples of effect pigments are metal pigments, for example of aluminium, interference pigments, such as, for example, metals coated with metal oxide or coated mica.

Fillers may also be contained in the coating compositions. These are fillers that are conventionally used in the coating industry. Examples of fillers are silicium dioxide, aluminum silicate, barium sulfate, calcium carbonate and talcum.

The coating composition can further contain water as well as small amounts of organic solvents. The organic solvents optionally present in the coating composition are preferably solvents conventionally used in coating techniques. These can result from the preparation of the binders or can be added separately. Suitable solvents are for example monohydric or polyhydric alcohols, for example, propanol, butanol, hexanol; glycol ethers or glycol esters, for example, diethylene glycol dialkylether, dipropylene glycol dialkylether, each with C1- to C6-alkyl, ethoxypropanol, butylglycol; glycols, for example ethylene glycol, propylene glycol and their oligomers, N-methylpyrrolidone and ketones, for example methylethylketone, acetone, cyclohexanone; aromatic or aliphatic carbohydrates, for example toluene, xylene or linear or branched aliphatic C6–C12-carbohydrates. It is preferred to use water-miscible solvents. The organic solvents are present in a proportion of up to, for example, at the most 10–15 wt-%, based on the total coating composition.

The coating compositions may further contain additives which are conventionally used in coating compositions. Examples of such additives are leveling agents, rheology-influencing agents, such as highly dispersed silicic acid or polymeric urea compounds, thickeners such as cross-linked polyacrylate thickeners or associative thickeners based on polyurethane, defoamers, surface-active agents, anti-crater agents, adhesion promotors and curing accelerators. The additives are used in the usual amounts known to the person skilled in the art.

The coating compositions can be prepared in a known manner by mixing together the individual components and homogenizing or milling them in the usual manner. In this way pigments and/or fillers that are present can be dispersed either in the epoxy resin component or in the cross-linking component. When using cross-linking agents containing amino groups it is preferred to carry out the dispersing step in the polyamine component. However, it is also possible to carry out the dispersing step with an additional grinding resin.

Depending on the type of cross-linking agents the aqueous dispersions of modified epoxy resins according to the invention can be formulated as single- or two-component coating compositions. In the case of the preferred use of cross-linking agents containing amino groups, these are two-component coating compositions. In this case the reactive binder components must be stored separately and can be mixed together only very shortly before their application.

Prior to the application, if necessary, water or organic solvents may in general still be used for adjusting the spray viscosity.

The coating compositions can be applied according to known processes, in particular by a spray application.

The coating compositions containing the dispersions of epoxy resins according to the invention are in particular suitable for the preparation of primer and/or primer surfacer layers of a multiple layer coating. The invention therefore also relates to the use of the aqueous dispersions of epoxy resins and the coating compositions containing them for the preparation of multi-layer coatings, whereby, in particular, the primer and/or primer surfacer layers of multi-layer coatings are prepared by means of the dispersions of epoxy resins according to the invention. They are in particular used for the coating of vehicles and vehicle parts.

The primer and/or primer surfacer layers can be applied in a conventional manner on optionally precoated substrates.

Metal and plastics substrates, in particular those known in the vehicle industry are suitable, such as, for example, iron, zinc, aluminum, magnesium, stainless steel or their alloys, as well as polyurethanes, polycarbonates or polyolefines. The primer and/or primer surfacer layers can be applied, for example, on optionally pretreated substrates such as, for example, bare steel sheet (sanded) and sanded in-house or prior coatings or on conventional cathodic electrodeposition coating substrates, primers or adhesion primers. After having been dried or optionally sanded, the primer and/or primer surfacer layers can be overcoated without difficulty with further coating compositions. The primer layers obtained according to the invention may for example be coated over with conventional primer surfacer layers or with primer surfacer layers consisting of primer surfacer coating compositions containing aqueous dispersions of epoxy resins according to the invention. The primer surfacer layers obtained according to the invention can be overcoated with conventional top coats. The latter can be a single layer top coat, for example based on acrylate/polyisocyanate, or conventional base coat/clear coat structures. It can be overcoated with solvent-based or water-based coating compositions.

The primer and/or primer surfacer layers can be dried at room temperature or force-dried at higher temperatures and/or cured. They can for example be dried and/or cured at room temperature over longer periods of time, for example, within 10–20 hours. However, after an optional flash-off time of for example 10 to 30 minutes, they can also undergo a drying process at higher temperatures, for example during 20 to 60 minutes at for example 40 to 80° C. They can likewise be cured at higher temperatures of for example above 80° C. to 180° C., preferably above 80° C. to 160° C.

The aqueous coating compositions containing the dispersions of epoxy resins according to the invention show sufficient working time of at least 90 minutes. The hcoating compositions can be applied without difficulty in particular as primer surfacer coating compositions in layer thicknesses of 140 μm and above. After the curing process, homogeneously coated substrates with smooth trouble-free surfaces are obtained. The coatings obtained exhibit a fast through-drying and a very good final hardness. After a short drying time, the coatings can be sanded without difficulty in a wet and dry state. The good sandability in the dry state as compared to the known binder systems is to be mentioned here. The abrasive paper does not become rapidly clogged. The very good adhesion on the most varied substrates, for example those mentioned above, constitutes an additional advantage.

The coating compositions containing the dispersions of epoxy resins according to the invention are suitable for the coating of vehicles and for industrial coating. The coating of vehicle and vehicle parts are preferred fields of application of the coating compositions. Depending on the curing conditions, the coating compositions may be used for coating vehicles and vehicle parts for repair purposes (curing temperatures of for example 20–80° C.) as well for coating vehicles in a production line (curing temperatures of for example 80–160° C.).

The invention will be further described with reference to the following examples.

EXAMPLES

Example 1

Preparation of an Aqueous Dispersion of Epoxy Resins I (epoxy component I)

a) 200 g technical polyethylene glycol with an average molecular weight (Mw) of 4000 and 18.5 g of a polyglycidyl ether based on bisphenol A with an epoxy equivalent weight of 185 were heated together at 100° C. and, while stirring, mixed with 0.9 g $BF_3$-etherate. The batch was heated at 130° C. and kept at this temperature until the reaction had decayed. The epoxy equivalent weight of the product thus obtained was about 70,000.

b) Subsequently, 325 g of an epoxy resin based on bisphenol A with an epoxy equivalent weight of 183 with 98 g bisphenol A and 27 g of the product obtained in step a) was reacted at 150–160° C. in the presence of 750 mg triphenylphosphine to an epoxy equivalent weight of 490–500 in a 2l-three-necked bottle equipped with a thermometer, impeller stirrer, reflux condenser and dropping funnel. The batch, while being cooled, was then diluted with 27 g benzyl alcohol and 60 g methoxypropanol. Below a temperature of 100° C., 105 g deionized water was uniformly added while stirring and while lowering the temperature to 70–60° C. over a period of time of 5–30 minutes, whereby an aqueous dispersion was obtained, which was subsequently further diluted with 208 g deionized water. The dispersion showed a solid content of 53.0 wt-%.

c) 42 g of a commercially available polyisocyanate (trimerised hexamethylene diisocyanate, NCO-number 20) was subsequently added to the product obtained in step b), during 15 minutes at room temperature. The batch was heated at 50° C. and kept at this temperature for 3 hours. The modified dispersion of epoxy resins thus obtained showed an epoxy equivalent weight of 900 and a urethane and urea group content of 41 mmol based on 100 g of solid content of the dispersion.

Example 2

Preparation of an Aqueous Dispersion of Epoxy Resins II (epoxy component II)

a) The process of example 1, step a) was followed in an analogous way.

b) Subsequently, the process of example 1, step b) was followed in an analogous way. 325 g of an epoxy resin based on bisphenol A with an epoxy equivalent weight of 183 with 98 g bisphenol A and 27 g of the product obtained in step a) was reacted at 150–160° C. in the presence of 750 mg triphenylphosphine to an epoxy equivalent weight of 490–500. The batch was then cooled to 80° C. and 10 g of a commercially available polyisocyanate (trimerised hexamethylene diisocyanate, NCO-number 20) was added during 10 minutes. The temperature was kept for 1.5 hours.

Subsequently, the batch was cooled to 60–70° C. Dilution with 27 g benzyl alcohol and 60 g methoxypropanol followed and, while stirring, 105 g deionized water was uniformly added over a period of time of 5–30 minutes, whereby an aqueous dispersion was obtained which was subsequently further diluted with 208 g deionized water. The dispersion showed a solid content of 53.5 wt-%. 32 g of a commercially available polyisocyanate (trimerised hexamethylene diisocyanate, NCO-number 20) was subsequently added to the product obtained in step b) during 10 minutes at room temperature. The batch was heated at 50° C. and kept at this temperature for 3 hours. The modified dispersion of epoxy resins thus obtained showed an epoxy equivalent weight of 850 and a urethane and urea group content of 41 mmol based on 100 g of solid content of the dispersion.

Example 3

Preparation of an Aqueous Dispersion of Epoxy Resins III (epoxy component III)

a) The process of example 1, step a) was followed in an analogous way.

b) Subsequently, the process of example 1, step b) was followed in an analogous way. 325 g of an epoxy resin based on bisphenol A with an epoxy equivalent weight of 183 with 98 g bisphenol A and 27 g of the product obtained in step a) was reacted at 150–160° C. in the presence of 750 mg triphenylphosphine to an epoxy equivalent weight of 490–500. The batch was then diluted, while being cooled, with 27 g benzyl alcohol and 60 g methoxypropanol. Below a temperature of 100° C., 105 g deionized water was uniformly added while stirring and while lowering the temperature to 70–60° C. over a period of time of 5–30 minutes, whereby an aqueous dispersion was obtained, which was subsequently further diluted with 238 g deionized water. The dispersion showed a solid content of 51.0 wt-%.

c) 84 g of a commercially available polyisocyanate (trimerised hexamethylene diisocyanate, NCO-number 20) was subsequently added to the product obtained in step b) during 20 minutes at room temperature. The batch was then heated at 50° C. and kept at this temperature for 3 hours. The modified dispersion of epoxy resins thus obtained showed an epoxy equivalent weight of 950 and a urethane and urea group content of 75 mmol based on 100 g of solid content of the dispersion.

Example 4

Preparation of a Primer Surfacer 5.0 parts by weight of a commercially available aminofunctional component (Bcckopox® SEH 2677 W80, 80% in water, Vianova Resins) were well mixed with 30.0 parts by weight demineralised water and 1.0 parts by weight of a commercially available polyurethane thickener (Borchigel® L75N, Borchers). 1.0 part by weight of a commercially available defoamer (BYK 011, BYK Chemie), 1.0 part by weight of a commercially available wetting additive (Tego® Wet 500, Tego) and 0.3 parts by weight of a corrosion inhibitor (Inhibitor L1) were added to the mixture and likewise well homogenized.

The following pigments and fillers were dispersed in the mixture in a conventional manner:

1.5 parts by weight of pyrogenic silicic acid 15.0 parts by weight of talcum 15.0 parts by weight of titanium dioxide 15.0 parts by weight of barium sulfate 3.0 parts by weight of a corrosion protection pigment (Heucophos® ZPO, Heubach).

The amino component thus obtained was mixed with 1 wt-% of a catalyst (Ancamin®) for the cross-linking reaction and with 4 wt-% demineralised water.

25,1 parts by weight of the epoxy component 1 was added to 74,9 parts by weight of the amino component thus obtained shortly before the application and both components, while stirring, were mixed and well homogenized.

Example 5
Preparation of a Comparative Primer Surfacer 74,5 parts by weight of the amino component prepared according to Example 4 and 25,5 parts by weight of a commercially available aqueous dispersion of epoxy resins (Beckopox® 384W, 50% in water, Vianova Resins) which had not been modified with urethane and/or urea groups, while stirring, shortly before the application, were mixed and well homogenized.

Example 6
Application of the Coating Compositions

A primer surfacer prepared according to Example 4 and a comparative primer surfacer prepared according to Example 5 were applied by spray application to several steel plates which had been precoated with a cathodic electrodeposition coating primer resulting in a dry coating layer of about 60 μm. The curing of the primer surfacer and the comparative primer surfacer was carried out for 16 hours at room temperature and separately, after a flash-off phase of 25 minutes, during 30 minutes at 60° C. A metal sheet coated with a comparative primer surfacer was cured separately for 45 minutes at 60° C.

The properties of the coatings that were obtained are shown in the following table:

| Property | Primer surfacer according to Example 4 | Comparative primer surfacer according to Example 5 | |
|---|---|---|---|
| Curing conditions | 30 min 60° C. | 30 min 60° C. | 45 min 60° C. |
| Final hardness (fingernail test) (1) | 1 | 2–3 | 2 |
| Adhesion (2) after temperature/humidity test (3) | 1–2 | 3 | 2–3 |
| Sandability (1)/clogging of the abrasive paper (4) after 30 min at 60° C. | 2/2 | 4/5 | 3/3 |
| Sandability (1)/clogging of the abrasive paper (4) after 16 hours at room temperature. | 3/3 | 5/5 | 5/5 |

(1) Rating: 1—very good, 2—good, 3—satisfactory, 4—poor, 5—very poor
(2) Grid cutting according to DIN 53151
(3) Temperature/humidity test according to DIN 50017
(4) Rating: 1—very slight, 2—slight, 3—average, 4—heavy, 5—very heavy The final hardness achieved by the primer surfacer formulated according to the invention is higher and it is also reached after a shorter period of hardening time as compared to comparable prior art primer surfacers. The improvement in dry sandability and the slight clogging of the abrasive paper after a hardening phase of 16 hours at room temperature and after 30 minutes drying in an oven at 60° C. are particularly worth mentioning. Even by extending the hardening time when drying in an oven by 50% to 45 minutes, these results are not reached by comparable prior art fillers.

What is claimed is:

1. An aqueous dispersion of modified epoxy resin with a urethane and a urea group content of 5–250 mmol, based on 100 g solid content of the dispersion, containing at least one modified epoxy resin A) having an epoxy equivalent weight of 250–10,000, whereby the modified epoxy resin A) are the reaction product of
    A1) 43.0–86.0 wt-% of at least one epoxy compound having at least 2 epoxy groups per molecule and an epoxy equivalent weight of 100 to 2000,
    A2) 10,0–25,0 wt-% of at least one aromatic polyol,
    A3) 2,0–12,0 wt-% of at least one aliphatic polyol and
    A4) 2,0–20,0 wt-% of at least one polyisocyanate,
wherein the percentages are relative to solid contents and wherein the sum of the components A1), A2), A3) and A4) adds up to 100 wt-%.

2. The dispersion of claim 1, characterized in that it comprises a urethane and a urea group content of 10–150 mmol, based on 100 g solid content of the dispersion and in that the modified epoxy resins A) comprise an epoxy equivalent weight of 450–2500.

3. The dispersion of claim 1, characterized in that it contains 30–80 wt-% water.

4. The dispersion of claim 1, characterized in that the component A3) is a polyether polyol.

5. The dispersion of claim 1, characterized in that the component A4) is a polyisocyanate having more than 2 isocyanate groups per molecule.

6. The dispersion of claim 1, characterized in that the components A1), A2) and A3) are reacted together in at least one step and that the reaction is carried out in a phase selected from the group of resin phase, aqueous phase and combinations thereof.

7. The dispersion of claim 6, characterized in that 0–70 wt-% of the polyisocyanates A4) are reacted in the resin phase and 30–100 wt-% of the polyisocyanates A4), based on the total amount of polyisocyanates A4), are reacted in the aqueous phase.

8. A coating composition comprising an aqueous dispersion of a modified epoxy resin with a urethane and a urea group content of 5–250 mmol, based on 100 g solid content of the dispersion, containing at least one modified epoxy resin A) having an epoxy equivalent weight of 250–10,000, whereby the modified epoxy resin A) are the reaction product of
    A1) 43.0–86.0 wt-% of at least one epoxy compound having at least 2 epoxy groups per molecule and an epoxy equivalent weight of 100 to 2000,
    A2) 10,0–25,0 wt-% of at least one aromatic polyol,
    A3) 2,0–12,0 wt-% of at least one aliphatic polyol and
    A4) 2,0–20,0 wt-% of at least one polyisocyanate,
wherein the percentages are relative to solid contents and wherein the sum of the components A1), A2), A3) and A4) adds up to 100 wt-%.

9. A coating composition of claim 8, further comprising at least one cross-linking agent.

10. A coating composition of claim 9, further comprising at least one polyamine cross-linking agents.

\* \* \* \* \*